United States Patent [19]

Mazenet

[11] Patent Number: 5,433,015
[45] Date of Patent: Jul. 18, 1995

[54] TOOL FOR MEASURING A CLAMPING FORCE EXERTED BY A MOVABLE SPINDLE OF A LENGTH MEASURING INSTRUMENT

[75] Inventor: Daniel Mazenet, Bois Le Roi, France

[73] Assignee: Societe Nationale d'Etude et de Construction de Moteurs d'Aviation "Snecma", Paris, France

[21] Appl. No.: 275,527

[22] Filed: Jul. 15, 1994

[30] Foreign Application Priority Data

Jul. 15, 1993 [FR] France .................. 93 08663

[51] Int. Cl.6 ................ G01B 5/14; G01B 5/02
[52] U.S. Cl. ...................... 33/815; 33/818; 33/828
[58] Field of Search .......... 33/815, 818, 819, 820, 33/821, 826, 828, 831; 73/1 B

[56] References Cited

U.S. PATENT DOCUMENTS

| | | |
|---|---|---|
| 1,625,767 | 4/1927 | Simpson . |
| 1,668,248 | 5/1928 | Olson ................ 33/828 |
| 2,009,519 | 7/1935 | Reed ................ 33/815 |
| 2,690,016 | 9/1954 | Seaholm . |
| 2,741,848 | 4/1956 | Livingston ........... 33/815 |
| 5,249,366 | 10/1993 | Takahashi et al. ..... 33/784 |

FOREIGN PATENT DOCUMENTS

| | | |
|---|---|---|
| 237422 | 8/1945 | Switzerland . |
| 277356 | 12/1951 | Switzerland . |
| 28187 | 9/1908 | United Kingdom ...... 33/828 |

*Primary Examiner*—Christopher W. Fulton
*Attorney, Agent, or Firm*—Oblon, Spivak, McClelland, Maier & Neustadt

[57] ABSTRACT

A tool for measuring and checking the clamping force exerted by a movable spindle of a length measuring instrument such as a micrometer comprises a housing which is arranged to receive the free end of the spindle when a rim of the housing is placed against a surface of the instrument body around the spindle and the spindle is advanced, a force sensor which is located at the bottom of the housing for engagement by the free end of the spindle, and a read-out device for indicating the force exerted by the spindle as measured by the force sensor.

8 Claims, 1 Drawing Sheet

TOOL FOR MEASURING A CLAMPING FORCE EXERTED BY A MOVABLE SPINDLE OF A LENGTH MEASURING INSTRUMENT

BACKGROUND OF THE INVENTION

The invention relates to a tool for measuring a clamping force exerted by a movable spindle of a length measuring instrument.

Precision length measuring instruments, usually termed micrometers, consist essentially of a body, a spindle mounted in the body so that it projects from the body and is axially movable relative thereto, an anvil fixed to the body in line with the spindle, means for causing the spindle to move and generally including a nut having a knurled gripping surface, and a stress limiter interposed between the spindle and the moving means.

In the case of an external micrometer, the article whose length is to be measured is placed between the free end of the spindle and the anvil, and the moving means is operated to bring the spindle closer to the anvil until the article is clamped. The stress limiter interrupts the action of the moving means as soon as the stopping force is reached.

The precise knowledge of this force is of considerable importance, and French Standard Ell-095 specifies that in principle it should be between 5 and 20 newtons.

Moreover, the variation of this force throughout the measurement should not exceed ±2.5 newtons.

If the stopping force is too weak, the clamping of the article is no longer ensured and it becomes difficult to measure in satisfactory circumstances. On the other hand, if it is excessive, mechanical deformations are produced which result in measurement errors.

It is therefore necessary periodically to measure the clamping force exerted by the movable spindle to check that the instrument meets the required standard, but, to the inventor's knowledge, there is no simple tool for this purpose in existence.

SUMMARY OF THE INVENTION

With a view to meeting this need, the invention provides a tool for measuring a clamping force exerted by a length measuring instrument, said instrument being of the kind comprising a body, an anvil fixed to said body, a spindle mounted in said body for movement towards and away from said anvil, said spindle having a free end for clamping an article against said anvil when a length of said article is being measured, and means for causing said spindle to move towards or away from said anvil, said means for causing said spindle to move including a torque limiter to limit the clamping force exerted by said free end of said spindle, said tool comprising a housing capable of receiving said free end of said spindle, said housing having a bottom and a rim intended to be placed against a surface of said body surrounding said spindle, a force sensor situated at said bottom of said housing for engagement by said free end of said spindle when said rim is positioned against said surface of said body and said spindle is moved towards said bottom, and means for reading the force to which said force sensor is subjected.

Preferably the force sensor is formed by a resilient membrane on which extensometric gauges are bonded.

The housing preferably includes an annular wall extending from the bottom around the sensor. The wall may be detachable from the bottom, and may also be made up by a stack of separable rings, the ends of which are then normally provided with means for enabling the rings to be assembled together.

These rings act as spacers and permit measurement of the clamping force exerted by the movable spindle at various positions of the spindle.

Further preferred features of the invention will become apparent from the following description of the preferred embodiments, given by way of example only, with reference to the accompanying drawings.

DESCRIPTION OF THE PREFERRED EMBODIMENTS

Figure 1:
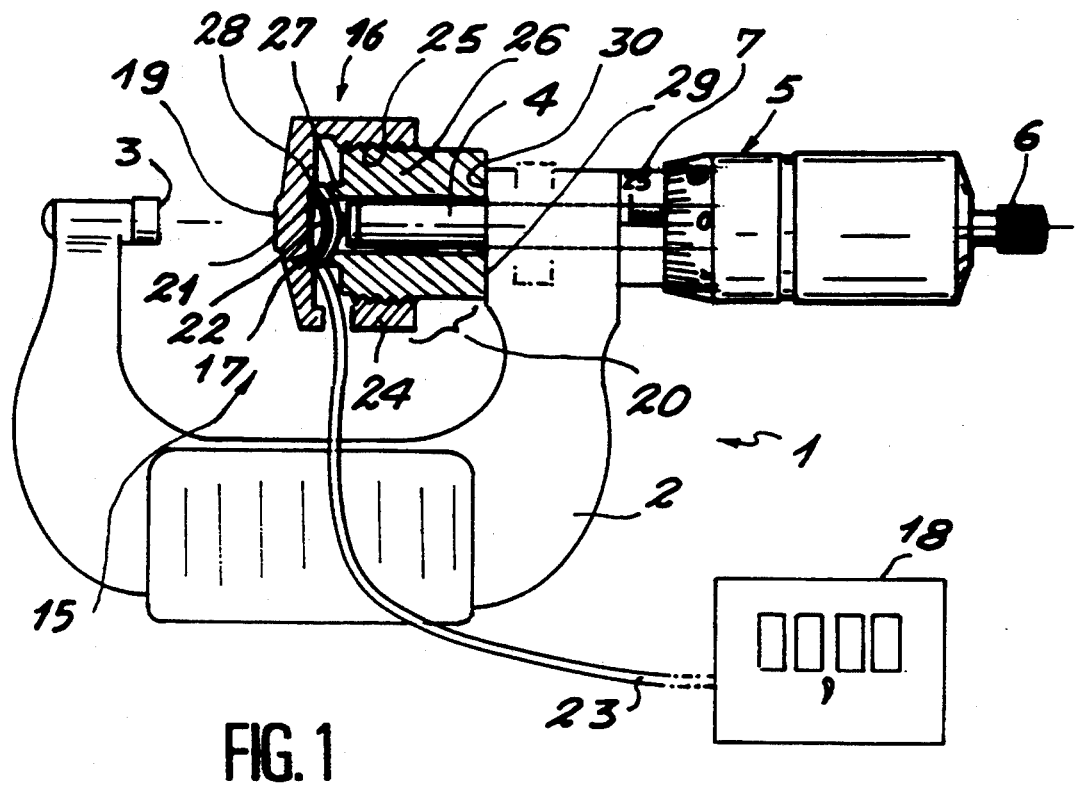
FIG. 1 is a part sectional view of a first embodiment of the invention shown in use in measuring the clamping force exerted by the spindle of a micrometer.

Illustrated in FIG. 1 is a micrometer 1 of standard construction comprising a bow-shaped body 2, a fixed anvil 3 at one end of the body 2, a movable spindle 4 at its other end, and a mechanism 5 for causing the movable spindle 4 to slide into and out of its housing in the body 2. The anvil 3 is in line with the movable spindle 4, and the object whose length is to be measured will be placed and clamped between them. The mechanism 5 for moving the spindle 4 comprises a knurled knob 6 and a precision screw which is an axial extension of the spindle and screws into a sleeve 7 which is rigidly connected to the body 2 of the micrometer 1. The knurled knob 6 drives this screw by means of a torque limiter. When the knurled knob 6 is rotated, the rotational movement is transmitted through the torque limiter to the precision screw, thus causing translation of the precision screw inside the sleeve 7 and hence axial movement of the spindle 4 which is rigidly connected to it. When the spindle 4 comes into contact with the object to be measured, the force exerted by the micrometer on the object increases, as does the torque necessary for the rotation of the screw. When the torque reaches a certain value, the torque limiter slips and the rotation of the knurled knob 6 no longer drives the screw. The clamping force exerted by the micrometer 1 on the object being measured thus stabilizes, and deformation of the object or of the bow-shaped body 2 of the micrometer is thereby prevented. It is this clamping force that is sought to be measured by the tool in accordance with the invention.

This tool is indicated by the general reference numeral 15 in FIG. 1, and consists of a housing 16 forming an open enclosure, a force sensor 17, and a read-out device 18. The housing 16 is formed by a flat bottom 19 and an annular wall 20. The force sensor 17, in its simplest form, is formed by a resilient domed membrane 21 carrying extensometer gauges 22 which are bonded to its inner face. Such force or pressure sensors are well known (being described, for example, in French patent No. 2 619 446) and require no further description here. Wires 23 connect the extensometer gauges 22 to the read-out device 18, which comprises, in a standard manner, a Wheatstone bridge for measuring the deformations of the extensometer gauges 22 by the variation of their resistances and a voltmeter connected to a terminal of the bridge, the data from which is converted to numerical data.

In the embodiment illustrated, the wall 20 is formed by an internally screw-threaded sleeve 24 which is integral with the bottom 19, and an externally screw-threaded, hollow cylindrical bushing 26 which is screwed into the sleeve 24. This bushing 26 has a collar 27 which projects from its flat end surface within the sleeve 24 and contacts the edge of the domed membrane 21 to press it against the bottom 19. The domed membrane 21 is accommodated in a recess 28 in the bottom 19 which is shallow and has a diameter not much greater than that of the membrane 21 itself, and hence the membrane is firmly held in the housing 21, thereby ensuring a greater reliability of measurement.

The bush 26 has a flat outer rim 29 which may be placed against a flat surface 30 of the bow-shaped body 2 which surrounds the aperture through which the movable spindle 4 passes.

The measuring process involves placing the outer rim 29 against the flat surface 30 and, while maintaining this contact between the housing 16 and the bow-shaped body 2 by clamping one against the other with one hand, advancing the movable spindle 4 using the other hand until it touches the force sensor 17. The device 18 then measures the force exerted on the force sensor 17 by the movable spindle 4, and in particular the force which is being exerted at the stage when the torque limiter has operated to prevent further movement of the spindle.

The bush 26 protrudes from the sleeve 24, and its length is selected depending on the position of the movable spindle 4 for which it is desired to measure the stopping force. It is possible to replace the bush 26 by another of different length, or perhaps to extend it by means of a nut screwed onto a possibly exposed part of its external thread.

Figure 2:
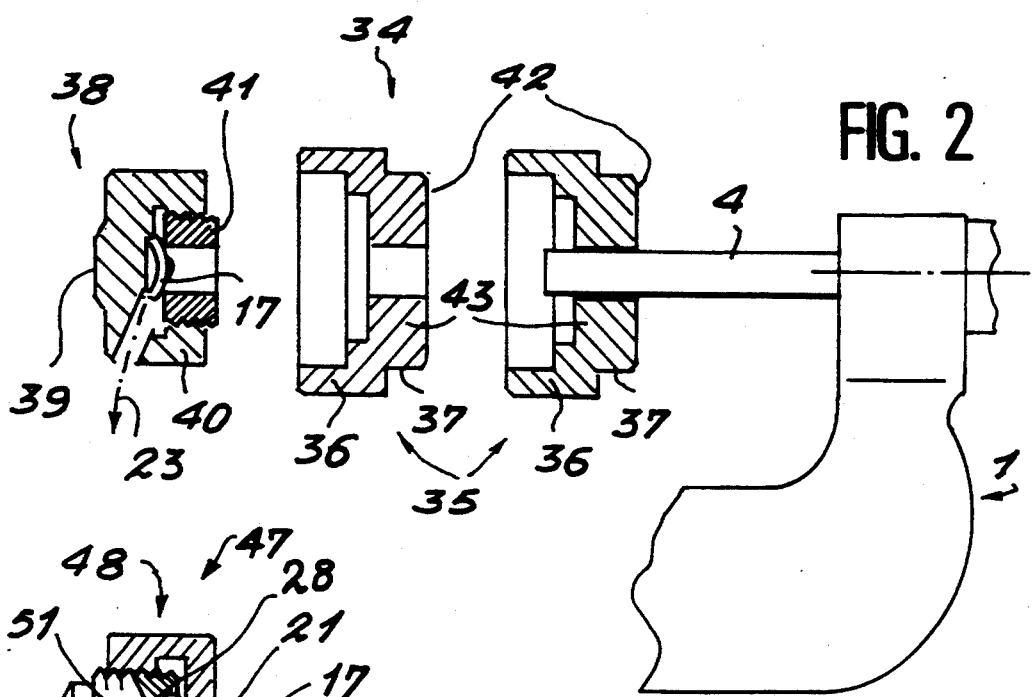
FIG. 2 is an exploded sectional view of a second embodiment of the invention.

In the embodiment shown in FIG. 2 the length of the tool 34 is also capable of adjustment, in this case by a stack of rings 35 each of which is provided at one end with a collar 36 which fits around a neck 37 of the ring 35 adjacent to it or a housing 38 accommodating a force sensor 17 as used in the first embodiment. The housing 38 comprises a flat bottom 39, an internally threaded sleeve 40 integral with the bottom 39, and a bushing 41 screwed into the sleeve to hold the force sensor 17 against the bottom. The housing 38 therefore has a structure which resembles that of the complete tool 15 in the preceding embodiment, but its parts are not as long. In this embodiment it may be considered that the tool is formed by the housing 38 and the stack of rings 35 which extend the housing 38.

Each ring 35 has a flat stop surface 42 at its end adjacent the neck 37 for engaging the flat surface 30 or another ring 35. This stop surface 42 is formed by the surface of a cap 43 which is perforated at its centre for the passage of the movable spindle 4. The rings 35 are shown disconnected in FIG. 2 for reasons of clarity, but is will be understood that they are tightly nested one in the other during measurement with the tool 34.

Figure 3:
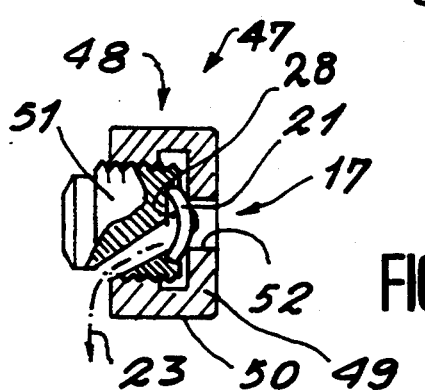
FIG. 3 is a sectional view of an alternative construction for an element of the embodiment shown in FIG. 2.

The construction of the tool 47 in the embodiment of FIG. 3 differs from the preceding one in that it comprises a housing 48 which has a flat wall 49 integral with a rearwardly extending internally threaded bush 50. A plug in the form of a screw 51 is engaged in the bush 50 and is used to clamp the force sensor 17 against the flat wall 49. The domed membrane 21 of the force sensor 17 is seated in a depression 28 in the screw 51 and is exposed behind a central aperture in the flat wall 49, the periphery of the membrane being pressed against the edge of the aperture. In this case the wires 23 leading from the force sensor 17 to the read-out device pass through the screw 51 instead of through the sleeve 24 or 40 as in the other embodiments. This construction may also be completed by any number of rings 35 as in the preceding embodiment. Otherwise, the housing 48, which is capsule like, bears on the flat surface 30 by means of its flat wall 49, the housing not having a projecting annular wall like the walls 20 or 40 in the previous embodiments.

I claim:

1. A tool for measuring a clamping force exerted by a length measuring instrument, said instrument being of the kind comprising a body, an anvil fixed to said body, a spindle mounted in said body for movement towards and away from said anvil, said spindle having a free end for clamping an article against said anvil when a length of said article is being measured, and means for causing said spindle to move towards or away from said anvil, said means for causing said spindle to move including a torque limiter to limit the clamping force exerted by said free end of said spindle, said tool comprising a housing capable of receiving said free end of said spindle, said housing having a bottom and a rim intended to be placed against a surface of said body surrounding said spindle, a force sensor situated at said bottom of said housing for engagement by said free end of said spindle when said rim is positioned against said surface of said body and said spindle is moved towards said bottom, and means for reading the force to which said force sensor is subjected.

2. A tool according to claim 1, wherein said force sensor is formed by a resilient membrane and extensometer gauges bonded to said membrane.

3. A tool according to claim 1, wherein said housing includes an annular wall around said force sensor and extending from said bottom.

4. A tool according to claim 3, wherein said annular wall is constituted by a sleeve rigidly connected to said bottom, and a bush screwed into said sleeve and holding said force sensor on said bottom.

5. A tool according to claim 1, wherein said housing includes a flat wall positioned in front of said force sensor, said flat wall having means defining an aperture to allow access to said force sensor by said free end of said spindle, a bush rigidly connected to said flat wall, and a plug screwed into said bush to push said force sensor back towards said flat wall.

6. A tool accordingly to claim 4 or claim 5, wherein said housing includes a stack of separable rings forming an extension of said housing.

7. A tool according to claim 6, wherein said rings have ends provided with assembly means for enabling said rings to be assembled together.

8. A tool according to claim 7, wherein said assembly means consists of nesting plug and socket means.

* * * * *

UNITED STATES PATENT AND TRADEMARK OFFICE
CERTIFICATE OF CORRECTION

PATENT NO. : 5,433,015
DATED : July 18, 1995
INVENTOR(S) : Daniel MAZENET

It is certified that error appears in the above-indentified patent and that said Letters Patent is hereby corrected as shown below:

```
Col. 3, line 6, change "bushing" to --bush--.

Col. 3, line 7, change "bushing" to --bush--.

Col. 3, line 45, change "bushing" to --bush--.

Col. 3, line 59, change "is" to --it--.
```

Signed and Sealed this

Twenty-eighth Day of May, 1996

*Attest:*

BRUCE LEHMAN

*Attesting Officer*    *Commissioner of Patents and Trademarks*